United States Patent
Nguyen

(10) Patent No.: US 7,853,818 B2
(45) Date of Patent: Dec. 14, 2010

(54) MODIFYING POWER ADAPTER OUTPUT

(75) Inventor: Don J Nguyen, Portland, OR (US)

(73) Assignee: Intel Corporation, Santa Clara, CA (US)

(*) Notice: Subject to any disclaimer, the term of this patent is extended or adjusted under 35 U.S.C. 154(b) by 1057 days.

(21) Appl. No.: 11/066,796

(22) Filed: Feb. 25, 2005

(65) Prior Publication Data

US 2006/0192530 A1 Aug. 31, 2006

(51) Int. Cl.
*G06F 1/26* (2006.01)
(52) U.S. Cl. ................................ 713/340; 713/300
(58) Field of Classification Search ............... 713/300, 713/340
See application file for complete search history.

(56) References Cited

U.S. PATENT DOCUMENTS

| | | | | |
|---|---|---|---|---|
| 4,962,462 | A | * 10/1990 | Fekete | 700/297 |
| 5,671,149 | A | 9/1997 | Brown | |
| 5,847,543 | A | 12/1998 | Carroll | |
| 6,172,884 | B1 | 1/2001 | Lanni | |
| 6,252,373 | B1 | 6/2001 | Stefansson et al. | |
| 6,498,460 | B1 * | 12/2002 | Atkinson | 320/135 |
| 6,836,101 | B2 * | 12/2004 | Lanni | 323/274 |
| 6,839,854 | B2 | 1/2005 | Nguyen | |
| 6,906,433 | B2 | 6/2005 | Nguyen | |
| 7,126,241 | B2 | 10/2006 | Popescu-Stanesti et al. | |
| 2004/0085045 | A1* | 5/2004 | Nakamura | 320/132 |
| 2005/0083615 | A1 | 4/2005 | Rose | |
| 2005/0142434 | A1 | 6/2005 | Nguyen et al. | |
| 2005/0146816 | A1 | 7/2005 | Nguyen et al. | |
| 2005/0162123 | A1 | 7/2005 | Sawyers | |
| 2007/0007822 | A1 | 1/2007 | Cioaca et al. | |
| 2007/0079153 | A1 | 4/2007 | Bain et al. | |
| 2007/0229023 | A1 | 10/2007 | Li et al. | |
| 2007/0229024 | A1 | 10/2007 | Li et al. | |
| 2007/0236171 | A1 | 10/2007 | Li et al. | |
| 2008/0122290 | A1 | 5/2008 | Li et al. | |
| 2008/0315831 | A1 | 12/2008 | Li et al. | |

FOREIGN PATENT DOCUMENTS

| | | |
|---|---|---|
| EP | 0588569 A2 | 3/1994 |
| WO | WO-2006093669 A2 | 9/2006 |
| WO | WO-2006093669 A3 | 9/2006 |

OTHER PUBLICATIONS

From Related PCT application Intel Ref P21511PCT; International Search Report and Written Opinion of the Inernational Searching Authority; Dated Aug. 2, 2006; PCT/US2006/005325, 10 pgs.
"International Preliminary Report on Patentability and Written Opinion of the International Searching Authority", PCT/US2006/005325, (Sep. 7, 2007), 7 pgs.

(Continued)

*Primary Examiner*—Tse Chen
(74) *Attorney, Agent, or Firm*—Caven & Aghevli LLC

(57) ABSTRACT

A method and apparatus to modify an output power of a power adapter coupled to a computing device in accordance with a power consumption of the computing device is discussed. Other embodiments are described and claimed.

26 Claims, 4 Drawing Sheets

OTHER PUBLICATIONS

Panasonic, Toughbook Catalog, "Lineup of Models with Intel Centrino Duo Mobile Technology", 2006, pp. 1-31.

IBM Thinkpad, "Battery Maximiser and Power Management Features Package", Version A1.38, Apr. 22, 2005, 13 pages.

Office Action received for U.S. Appl. No. 11/765,957, mailed on Mar. 17, 2009, 12 pages.

Office Action received for U.S. Appl. No. 11/765,957, mailed on Oct. 26, 2009, 11 pages.

Office Action received for U.S. Appl. No. 11/765,957, mailed on Mar. 17, 2010, 11 pages.

Office Action received for U.S. Appl. No. 11/395,677, mailed on Jul. 24, 2009, 13 pages.

Office Action received for U.S. Appl. No. 11/395,677, mailed on Jan. 13, 2009, 11 pages.

Li, "Balancing Power Supply and Demand", U.S. Appl. No. 12/714,075, Filed on Feb. 26, 2010.

* cited by examiner

MODIFYING POWER ADAPTER OUTPUT

TECHNICAL FIELD

The present disclosure generally relates to the field of power management. More particularly, an embodiment relates to modifying the output of a power adapter.

BACKGROUND

Notebook computers (also called laptop computers) are lightweight personal computers, which are quickly gaining popularity. The popularity of the notebook computers has been increasing, in part, since their prices have been dropping steadily, while maintaining similar performance as their larger siblings (i.e., desktop computers or workstations).

One advantage of notebook computers is their ease of portability. Their portability, however, exposes the notebook computers to a variety of environments. For example, a notebook computer may be utilized in a controlled office environment in the morning and outside (in the hot summer sun) the same afternoon.

Power adapters generally consume more power than other individual components of the notebook computer. To operate the internal components of notebook computers, external power adapters may be utilized. Also, power adapters often become hot to the touch, especially when used in a non-controlled environment.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Figure 1:
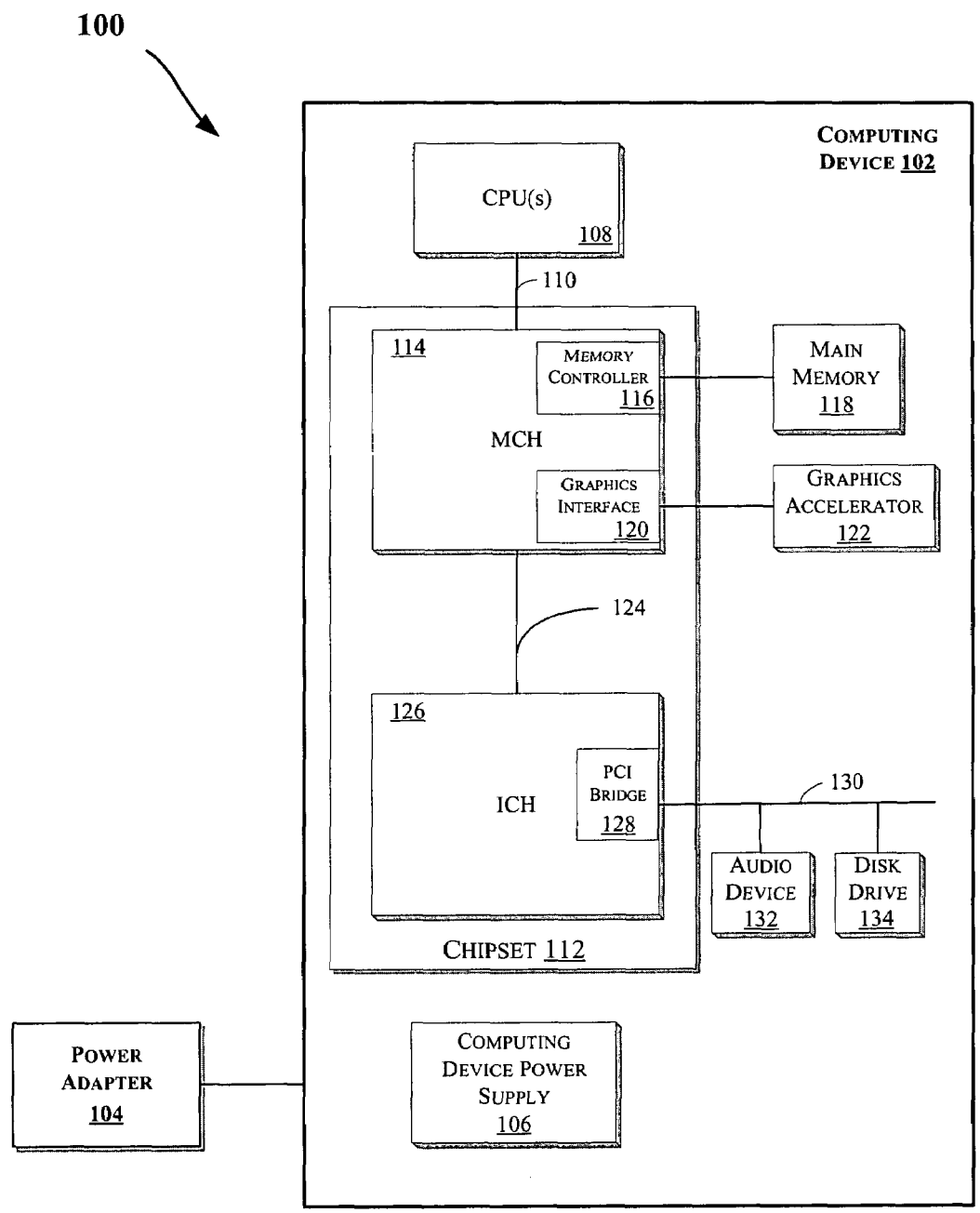
FIG. 1 illustrates a block diagram of a computer system in accordance with an embodiment.

FIG. 1 illustrates a block diagram of a computer system 100 in accordance with an embodiment. The computer system 100 includes a computing device 102 and a power adapter 104 (e.g., to supply electrical power to the computing device 102). The computing device 102 may be any suitable computing device such as a laptop (or notebook) computer, a personal digital assistant, a desktop computing device (e.g., a workstation or a desktop computer), a rack-mounted computing device, and the like.

Electrical power may be provided to various components of the computing device 102 (e.g., through a computing device power supply 106) from one or more of the following sources: one or more battery packs, an alternating current (AC) outlet (e.g., through a transformer and/or adaptor such as a power adapter 104), automotive power supplies, airplane power supplies, and the like. In one embodiment, the power adapter 104 may transform the power supply source output (e.g., the AC outlet voltage of about 110VAC to 240VAC) to a direct current (DC) voltage ranging between about 7VDC to 12.6VDC. Accordingly, the power adapter 104 may be an AC/DC adapter.

The computing device 102 also includes one or more central processing unit(s) (CPUs) 108 coupled to a bus 110. In one embodiment, the CPU 108 is one or more processors in the Pentium® family of processors including the Pentium® II processor family, Pentium® III processors, Pentium® IV processors available from Intel® Corporation of Santa Clara, Calif. Alternatively, other CPUs may be used, such as Intel's Itanium®, XEON™, and Celeron® processors. Also, one or more processors from other manufactures may be utilized. Moreover, the processors may have a single or multi core design.

A chipset 112 is also coupled to the bus 110. The chipset 112 includes a memory control hub (MCH) 114. The MCH 114 may include a memory controller 116 that is coupled to a main system memory 118. The main system memory 118 stores data and sequences of instructions that are executed by the CPU 108, or any other device included in the system 100. In one embodiment, the main system memory 118 includes random access memory (RAM); however, the main system memory 118 may be implemented using other memory types such as dynamic RAM (DRAM), synchronous DRAM (SDRAM), and the like. Additional devices may also be coupled to the bus 110, such as multiple CPUs and/or multiple system memories.

The MCH 114 may also include a graphics interface 120 coupled to a graphics accelerator 122. In one embodiment, the graphics interface 120 is coupled to the graphics accelerator 122 via an accelerated graphics port (AGP). In an embodiment, a display (such as a flat panel display) may be coupled to the graphics interface 120 through, for example, a signal converter that translates a digital representation of an image stored in a storage device such as video memory or system memory into display signals that are interpreted and displayed by the display. The display signals produced by the display device may pass through various control devices before being interpreted by and subsequently displayed on the display.

A hub interface 124 couples the MCH 114 to an input/output control hub (ICH) 126. The ICH 126 provides an interface to input/output (I/O) devices coupled to the computer system 100. The ICH 126 may be coupled to a peripheral component interconnect (PCI) bus. Hence, the ICH 126 includes a PCI bridge 128 that provides an interface to a PCI bus 130. The PCI bridge 128 provides a data path between the CPU 108 and peripheral devices. Additionally, other types of I/O interconnect topologies may be utilized such as the PCI Express™ architecture, available through Intel® Corporation of Santa Clara, Calif.

The PCI bus 130 may be coupled to an audio device 132 and one or more disk drive(s) 134. Other devices may be coupled to the PCI bus 130. In addition, the CPU 108 and the MCH 114 may be combined to form a single chip. Furthermore, the graphics accelerator 122 may be included within the MCH 114 in other embodiments.

Additionally, other peripherals coupled to the ICH 126 may include, in various embodiments, integrated drive electronics (IDE) or small computer system interface (SCSI) hard drive(s), universal serial bus (USB) port(s), a keyboard, a mouse, parallel port(s), serial port(s), floppy disk drive(s), digital output support (e.g., digital video interface (DVI)), and the like. Hence, the computing device 102 may include volatile and/or nonvolatile memory.

Figure 2:
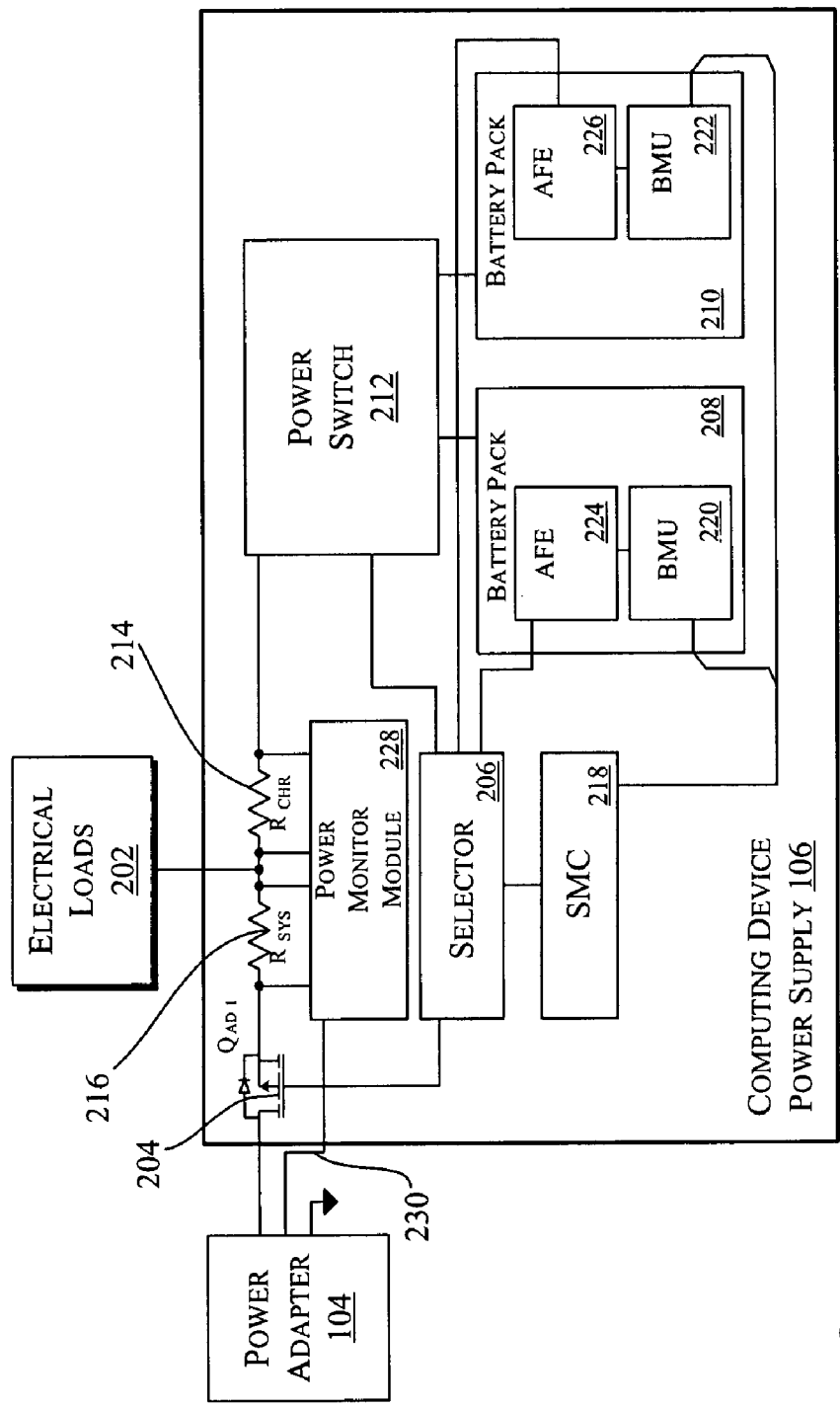
FIG. 2 illustrates a block diagram of a power system in accordance with an embodiment.

FIG. 2 illustrates a block diagram of a power system 200 in accordance with an embodiment. The power system 200 includes the power adapter 104 and the computing device power supply 106 discussed with reference to FIG. 1. In one embodiment, the power system 200 illustrates further details regarding the computing device power supply 106 of FIG. 1.

The power system includes electrical loads 202 coupled to the computing device power supply 106. The electrical loads 202 may represent various components of the computing device 102 of FIG. 1 which derive their power from the power adapter 104 (e.g., through the computing device power supply 106). For example, the electrical loads 202 may represent power usage by items 108-134 discussed with reference to FIG. 1. In one embodiment, one or more DC to DC voltage regulators may be utilized between the computing device power supply 106 and the electrical loads 202 (not shown), e.g., to regulate the voltage provided to the various components of the computing device 102.

As illustrated in FIG. 2, the computing device power supply 106 may include a transistor 204 ($Q_{AD1}$) to switch the voltage potential provided by the power adapter 104. As illustrated in FIG. 2, the power adapter 104 may be connected to ground. The transistor 204 may be any suitable transistor including a power transistor, such as a field effect transistor (FET), a metal oxide silicon FET (MOSFET), and the like. The gate of the transistor 204 ($Q_{AD1}$) is coupled to a selector 206 to control the flow of current from the power adapter 104 into the computing device power supply 106.

The selector 206 is also coupled to one or more battery packs (208 and 210) and a power switch 212. The battery packs (208-210) may provide reserve power for the electrical loads 202, e.g., when the power adapter 104 is disconnected from the computing device power supply 106 and/or a power source (such as those discussed with reference to FIG. 1). The power switch 212 is coupled to the battery packs (208-210) and controlled by the selector 206 to switch power to and from the battery packs (208-210) on or off. For example, to provide reserve power (from the battery packs 208 and 210) to the electrical loads 202, e.g., through a resistor 214 ($R_{CHR}$), the selector 206 may switch on the power switch 212. Alternatively, when charging the battery packs (208-210), the selector 206 may turn on the power switch 212 to provide power to the battery packs (208-210) through the transistor 204 ($Q_{AD1}$), a resistor 216 ($R_{SYS}$), and the resistor 214 ($R_{CHR}$).

In an embodiment, the selector 206 may switch the flow of power from the power adapter 104 on or off based on the state of the battery packs (208-210) and/or the electrical loads. For example, if the battery packs (208-210) are fully charged and the electrical loads 202 are off (e.g., the computing device 102 is shut down), the selector 206 may switch off the flow of current from the power adapter 104 into the computing device power supply 106. Alternatively, if the battery packs (208-210) are to be charged and the electrical loads 202 are off (e.g., the computing device 102 is shut down), the selector 206 may switch on the transistor 204 and the power switch 212 to allow the flow of current from the power adapter 104 into the battery packs (208-210). In an embodiment, the power switch 212 includes a suitable transistor controlled by the selector 206 for each battery pack (208-210), including a power transistor, such as a FET, a MOSFET, and the like.

Furthermore, the selector 206 may determine when to switch between a plurality of battery packs (208-210). For example, when a battery pack (208 or 210) is removed from the computing device power supply 106, the selector 206 may switch to any remaining battery packs. The power switch 212 may be utilized to avoid safety issues (e.g., by having exposed battery terminal pins) when a battery pack is removed.

The computing device power supply 106 also includes a system management controller (SMC) 218 which is coupled to the battery packs (208-210) to monitor the current flow into and out of the battery packs to determine the charge level and capacity of each battery pack. In one embodiment, each battery pack may include a battery management unit (BMU) (220 and 222) to monitor the current flow through the battery pack. The SMC 218 is also coupled to the selector 206 to communicate the battery pack charge level and capacity information.

The selector 206 is coupled to an analog front end (AFE) (224 and 226) within each battery pack, e.g., to switch the flow of power between the battery packs and the power switch 212. In an embodiment, the AFEs (224 and 226) are coupled to the power switch through one or more suitable transistors, including a power transistor, such as a FET, a MOSFET, and the like.

The computing device power supply 106 additionally includes a power monitor module 228 coupled to measure the voltage across the resistors 214 and 216. In one embodiment, the resistors 214 and 216 have fixed values. The power monitor module 228 may be coupled to measure the current flow through the resistors 214 and 216. For example, the power monitor module 228 may monitor the total system power consumption (e.g., by measuring the voltage across the resistor 216) and the battery pack charging power (e.g., by measuring the voltage across the resistor 214). The power monitor module 228 is coupled to the power adapter 104 through a feedback pin 230, e.g., to control the output power of the power adapter 104, as will be further discussed with respect to FIG. 3 in accordance with an embodiment. Accordingly, the power monitor module 228 may modify the output power of the power adapter 104 in accordance with the power consumption of the computing device 102.

Figure 3:
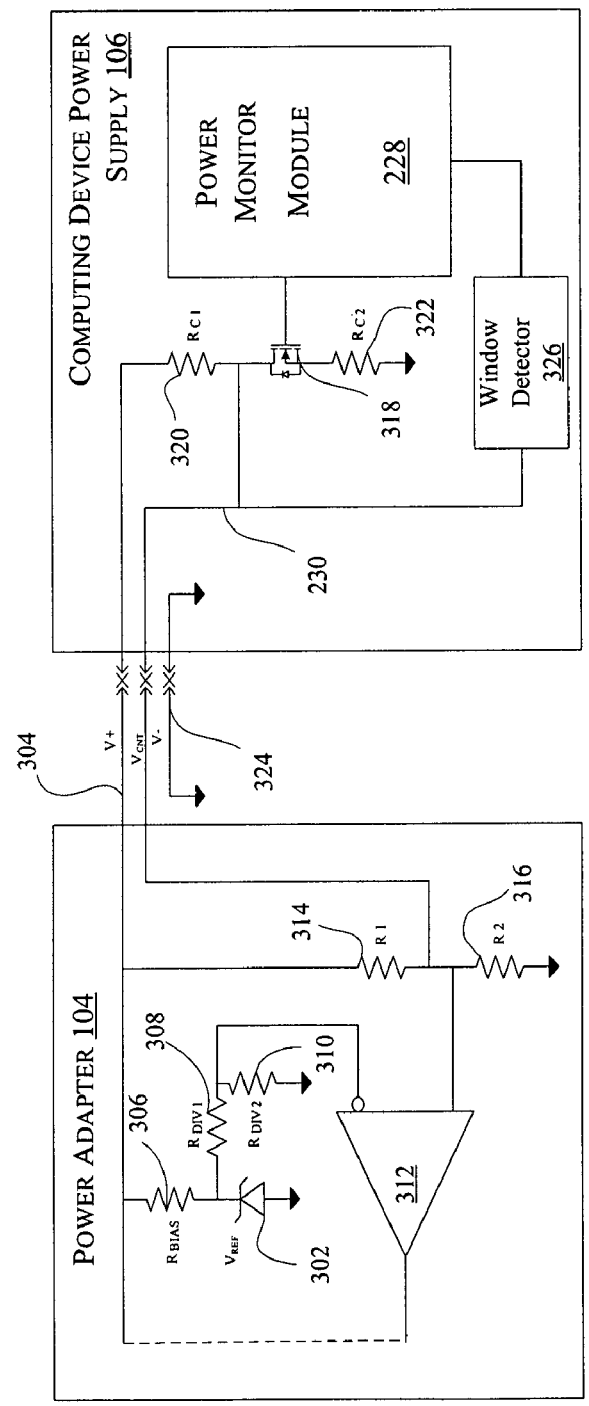
FIG. 3 illustrates a block diagram of a power adapter feedback system in accordance with an embodiment.

FIG. 3 illustrates a block diagram of a power adapter feedback system 300 in accordance with an embodiment. The power adapter feedback system 300 illustrates an embodiment of the power adapter 104 and portions of the computing device power supply 106. The power adapter 104 includes a reference voltage source ($V_{REF}$) 302 which is coupled to a positive voltage source of the power adapter 104 (V+) 304 through a biasing resistor ($R_{BIAS}$) 306. As discussed with reference to FIG. 2, the positive voltage source 304 may be coupled to the transistor 204 (shown in FIG. 2).

The power adapter 104 also includes resistors 308 ($R_{DIV1}$) and 310 ($R_{DIV2}$) to divide the reference voltage 302 prior to providing a potential to an inverting input of a comparator 312. The resistors 308 and 310 may have any suitable value. Also, the value of resistors 308 and 310 may be fixed in one embodiment. The comparator 312 may be any suitable comparator such as an operational amplifier. As illustrated in FIG. 3, the output of the comparator 312 may be fed back through various components of the power adapter 104 (not shown) to the positive voltage source 304. Moreover, the comparator 312 receives its non-inverting input from the positive voltage source 304 through resistors 314 (R1) and 316 (R2). The resistors 314 and 316 may have any suitable value. Also, the value of resistors 314 and 316 may be fixed in one embodiment.

As illustrated in FIG. 3, the resistors 314 and 316 (and the non-inverting input of the comparator 312) are coupled to the feedback pin 230 ($V_{CNT}$). The feedback pin 230 is coupled to the power monitor module 228 through a suitable transistor 318, including a power transistor, such as a FET, a MOSFET, and the like. The transistor 318 is coupled to the positive voltage source 304 and ground through resistors 320 and 322, respectively. The resistors 320 and 322 may have any suitable value. Also, the value of resistors 320 and 322 may be fixed in one embodiment. The system 300 also illustrates a negative voltage pin 324, e.g., to provide a differential voltage source in conjunction with the positive voltage source 304.

As illustrated in FIG. 3, the power monitor module 228 may utilize the transistor 318 to inject a current into the feedback pin 230. For example, to increase the battery charging current (such as discussed with reference to FIG. 2), the power monitor module 228 may reduce the current into the resistor divider network (314 and 316). Similarly, to decrease the battery charging current, the power monitor module 228 may increase the current into the resistor divider network (314 and 316).

Also, as illustrated in FIG. 3, the power monitor module 228 is coupled to the feedback pin 230 through a window detector 326, e.g., to sense the output power of the power adapter 104 (by sensing the feedback voltage present on the feedback pin 230 ($V_{CNT}$), and present at the inputs of the comparator 312). The window detector 326 may be incorporated into the power monitor module 228 in an embodiment. In an embodiment, the window detector 326 may include an operational amplifier with a feedback loop to permit acceptance of any range of power output by the power adapter 104.

In one embodiment, the feedback pin 230 may be utilized to modify the output power of the power adapter and/or to sense the current maximum power rating of the power adapter. Hence, the power adapter (104) may provide its power rating to the computing device (102). For example, the power monitor module 228 may determine the maximum charge of the battery pack (208-210) such as discussed with reference to FIG. 2, and when the battery packs are fully charged, the power monitor module 228 reduces the output power of the power adapter 104 to avoid damaging the battery packs and/or causing safety issues such as overheating.

Figure 4:
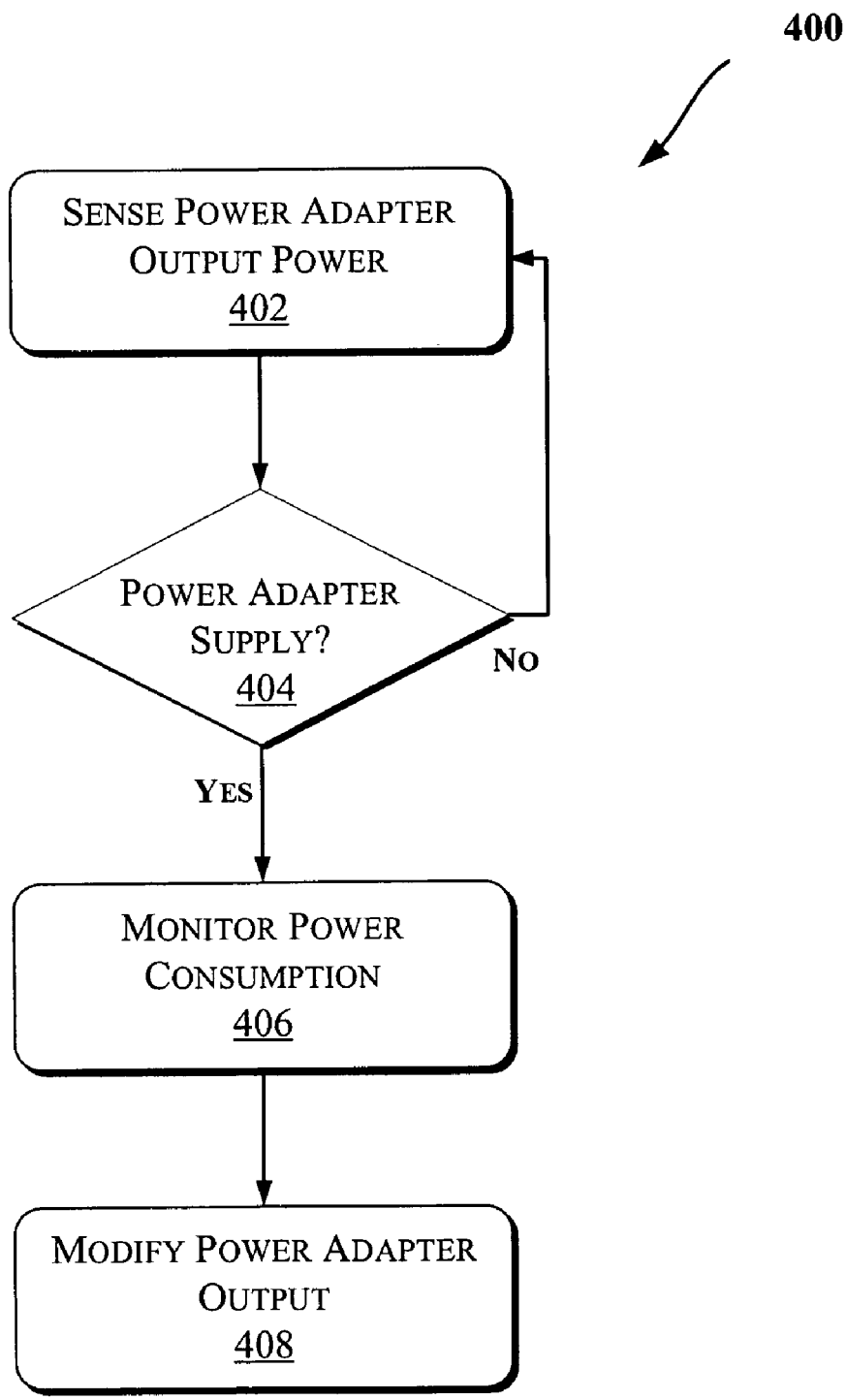
FIG. 4 illustrates a flow diagram of a method for modifying the output power of a power adapter in accordance with an embodiment.

FIG. 4 illustrates a flow diagram of a method 400 for modifying the output power of a power adapter in accordance with an embodiment. In various embodiments, the method 400 may be applied to portions of one or more systems discussed with reference to FIGS. 1-3.

The method 400 starts by sensing the output power of a power adapter (402). As discussed with reference to FIG. 3, the sensing of stage 402 may be performed by the window detector 326 through the feedback pin 230. The method 400 further determines whether a power adapter (such as 104 of FIGS. 1-3) is supplying power to a computing device (such as 102 of FIG. 1, e.g., through the computing device power supply 106). For example, if in the stage 402 it is determined that the power adapter is not present, or no output power is sensed, the stage 404 fails and the method 400 returns to the stage 402.

Once it is determined that that a power adapter is supplying power to the computing device (404), the power consumption of the computing device is monitored (406). The monitoring of the stage 406 may be performed by the power monitor module 228. Also, as discussed with reference to the power monitor module 228, the monitoring stage (406) may include determining the charge level of the battery packs (e.g., by measuring the voltage across the resistor 214 of FIG. 2).

In a stage 408, the output power of the power adapter (104) is modified in accordance with power consumption of the computing device (406). As discussed with reference to FIGS. 2 and 3, the power monitor module 228 may utilize the feedback pin 230 to control the output power of the power adapter (104). Also, the power monitor module 228 may be implemented in or internal to the computing device (102).

Reference in the specification to "one embodiment" or "an embodiment" means that a particular feature, structure, or characteristic described in connection with the embodiment is included in at least an implementation. The appearances of the phrase "in one embodiment" in various places in the specification may or may not be all referring to the same embodiment.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. A computing device comprising:
a power supply to charge one or more battery packs;
logic to generate a first signal to reduce a flow of current into the power supply after the one or more battery packs are charged, wherein the flow of current into the power supply is determined based on power consumption of one or more electronic components coupled to the power supply; and
a power adapter to supply the flow of current into the power supply, wherein the power adapter is to comprise at least two resistors to form a resistor divider network and wherein the logic is to cause injection of a current into the resistor divider network to control the flow of current into the power supply.

2. The computing device of claim 1, wherein the first signal is to switch off the flow of current into the power supply.

3. The computing device of claim 1, wherein the logic is to generate a second signal to switch on the flow of current into the power supply.

4. The computing device of claim 1, further comprising a power monitor module to monitor the power consumption of the one or more battery packs.

5. The computing device of claim 1, further comprising a comparator to supply the flow of current into the power supply based at least in part on a signal to be generated by the resistor divider network.

6. The computing device of claim 1, wherein the power adapter is an alternating current/direct current (AC/DC) power adapter.

7. The computing device of claim 1, further comprising a system management controller (SMC) to determine a charge level of the one or more battery packs.

8. A system comprising:
a power supply to provide electrical power to one or more electronic components;
a first logic to monitor power consumption of the one or more electronic components;
a second logic to generate a signal to control a flow of electrical current into the power supply in accordance with the power consumption of the one or more electronic components; and
a power adapter to supply the flow of electrical current into the power supply, wherein the power adapter is to comprise at least two resistors to form a resistor divider network and wherein the second logic is to cause injection of a current into the resistor divider network to control the flow of current into the power supply.

9. The system of claim 8, wherein the signal is to reduce the flow of electrical current into the power supply.

10. The system of claim 9, wherein the signal is to switch off the power supply.

11. The system of claim 8, wherein the signal is to increase the flow of electrical current into the power supply such that the power supply is switched on.

12. The system of claim 11, wherein the signal is to switch on the power supply.

13. The system of claim 8, further comprising a third logic to sense the generated signal.

14. The system of claim 8, further comprising a comparator to supply the flow of electrical current into the power supply based at least in part on a signal to be generated by the resistor divider network.

15. The system of claim 8, wherein the power adapter is an alternating current/direct current (AC/DC) power adapter.

16. A method comprising:
    monitoring power consumption of one or more components of a computing device;
    generating a signal to control a supply of current into a power supply of the computing device in accordance with the power consumption of the one or more components; and
    supplying the flow of electrical current from a power adapter into the power supply, wherein the power adapter is to comprise at least two resistors to form a resistor divider network and wherein a logic is to cause injection of a current into the resistor divider network to control the flow of current into the power supply.

17. The method of claim 16, wherein the generated signal is to switch off the supply of current into the power supply.

18. The method of claim 16, wherein the generated signal is to switch on the supply of current into the power supply.

19. The method of claim 16, wherein monitoring the power consumption of the one or more components comprises determining a charge level of one or more battery packs.

20. The method of claim 19, further comprising reducing the supply of current into the power supply after the one or more battery packs of the computing device are fully charged.

21. The method of claim 19, further comprising sensing a capacity of the one or more battery packs of the computing device.

22. The method of claim 16, further comprising sensing the generated signal.

23. The device of claim 1, wherein at least one of the one or more battery packs is to comprise a battery management unit (BMU) to monitor current flow through the at least one battery pack.

24. The device of claim 1, wherein at least one of the one or more battery packs is to comprise an analog front end (AFE) to switch flow of power between the at least one battery pack and a power switch.

25. The computing device of claim 1, further comprising a selector to select between at least two battery packs based on at least a charge level of one of the one or more battery packs.

26. The system of claim 8, further comprising a selector to select between at least two battery packs based on at least a charge level of one of the one or more battery packs.

* * * * *